May 21, 1963 S. GAULEY 3,090,357
RECORDER PEN
Filed May 29, 1961
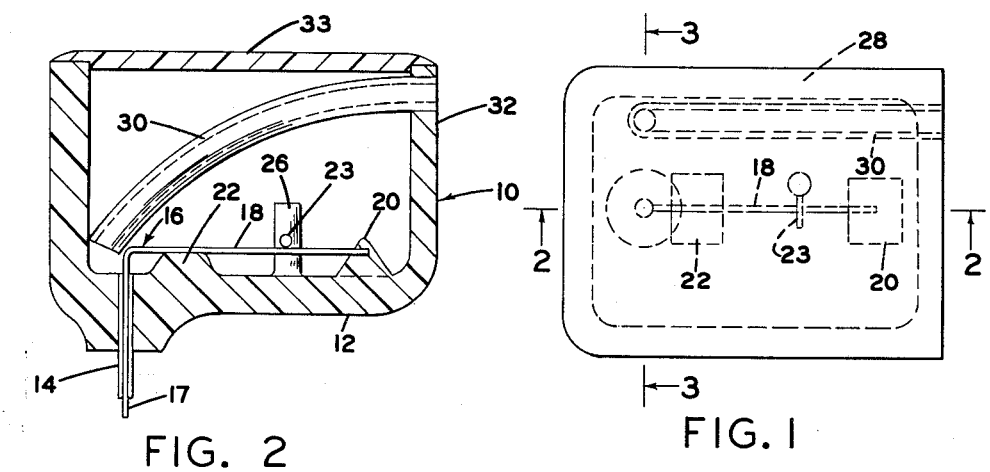
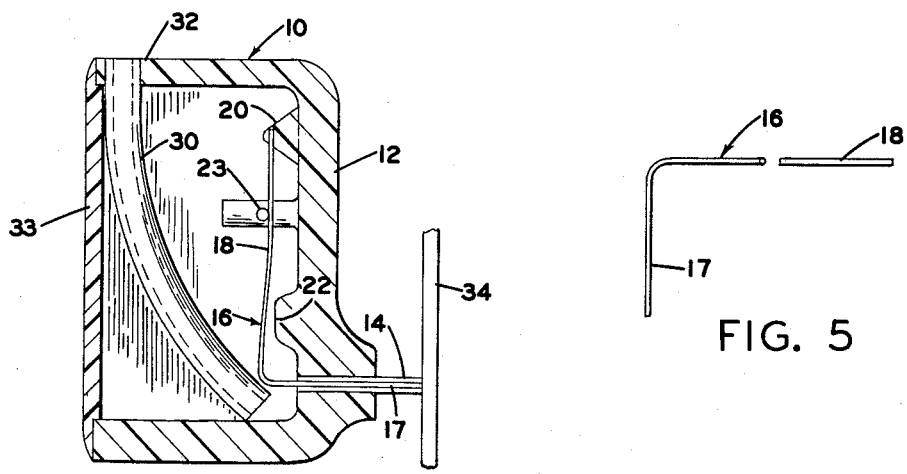
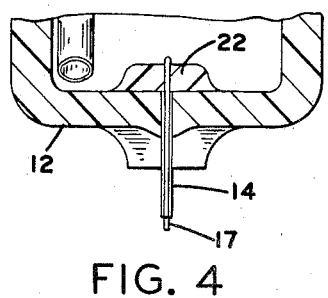
INVENTOR.
SHERMAN GAULEY
BY Frank C. Parker
David E. Dougherty
ATTORNEYS United States Patent Office 3,090,357
Patented May 21, 1963

3,090,357
RECORDER PEN
Sherman Gauley, Irondequoit, N.Y., assignor to Bausch & Lomb Incorporated, Rochester, N.Y., a corporation of New York
Filed May 29, 1961, Ser. No. 113,510
3 Claims. (Cl. 120—42.06)

This invention relates to a novel recorder pen and more particularly to a novel recorder pen having an integral spring needle.

Strip chart recorders have come into wide spread use in conjunction with electronic test equipment. Recorders of this type should be responsive to frequent changes indicated by the electronic equipment. These changes are often rapid and require a pen to move a relatively large distance in a relatively short interval of time. At other times the pen is moved over a comparatively lesser distance during a similar time interval.

Frequently a recorder is temporarily withdrawn from use for a short time interval. It is desirable therefor to incorporate a pen having means for overcoming a problem caused by ink drying on the point during non-use. It is also desirable to produce a recorder which is operative in either a vertical or horizontal plane.

A recorder pen according to the present invention incorporates an integral spring needle. This integral spring needle overcomes to a high degree the problem caused by ink drying on the pen point during intervals of non-use. The integral spring needle moves axially within an outer tube to provide an ink flow when the point is brought into contact with a surface. There is also a small degree of lateral movement of the needle within the outer tube which enhances the response of the pen even though the pen remains in contact with the strip chart during periods of non-use.

The flow of ink from a novel pen according to the invention provides a relatively even line, notwithstanding large changes in the rate of movement. The ink flow is not dependent on the plane of the strip chart and therefore the novel pen is operable through a 90° change of attitude. This latter provision facilitates the production of a portable unit. Accordingly the novel pen incorporates a feature which tends to minimize the possibility of spilling ink during movement of the device.

Advantageously the novel pen disclosed herein is reliable in use, durable in service and relatively inexpensive to manufacture.

Briefly, a recorder pen according to the present invention comprises a reservoir which is adapted to contain a supply of ink. A feed tube, generally similar to a hypodermic needle is arranged in a wall of the reservoir and extends therethrough. A vent tube is also arranged in a wall of the reservoir and has one end within the reservoir relatively close to the feed tube. An opposite end of the vent tube connects the interior of the reservoir with the exterior thereof to thereby form a vent. The vent arrangement is effective in a horizontal or vertical position and tends to minimize the probability of ink spillage.

An integral spring needle according to the preferred embodiment of the invention comprises a relatively thin stainless steel wire. A first portion of the wire extends from within the reservoir through the feed tube and slightly beyond the outer end of the feed tube. A second portion of the wire is fixed within the reservoir and biases the first portion in a direction through the feed tube and away from the reservoir. The reservoir includes a cap so that it may be rotated to either the horizontal or vertical positions without ink spillage.

The invention will now be described in more detail in connection with the accompanying drawings, in which:

FIG. 1 is a top plan view of a novel recorder pen according to the invention;
FIG. 2 is a cross sectional view taken along the line 2—2 in FIG. 1;
FIG. 3 is a cross sectional view of a novel pen according to the invention taken along the line 3—3 in FIG. 1 and rotated 90° for writing on a vertical chart;
FIG. 4 is a front fragmentary view of a novel pen according to the invention; and,
FIG. 5 is a side elevational view of a spring needle according to the preferred embodiment of the invention.

Referring now more particularly to the drawings, a novel pen according to the invention includes a reservoir 10 having a shape generally similar to a rectangular box. The reservoir 10 is normally molded plastic, however any suitable material may be used. A lower portion or base 12, corresponding to the bottom of a box has a hollow tube 14 fixed therein. The tube 14 interconnects the interior and exterior of the reservoir 10 and extends beyond the base 12 to form a pen point.

The tube 14 has an integral spring needle 16 extending through the tube 14 in axial alignment therewith. The integral spring needle comprises a first portion 17 extending through the tube 14, and a second portion 18. The second portion 18 is separated from the first portion 17 by a right angle bend and is fixed within the reservoir 10.

The second portion 18 is fixed to a projection 20 which comprises a raised portion in the base 12. The portion 18 also extends under a pivot 23 arranged between the projection 20 and a second projection 22. The pivot 23 may be fixed to a vertical member 26 or may be mounted in one of the side walls 28. The arrangement of the pivot 23 and portion 18 is effective to bias the first portion 17 in a direction through the tube 14 and away from the reservoir 10.

A vent tube 30 is fixed to a side wall 32 and extends therethrough to interconnect the interior of the reservoir 10 with the exterior thereof. One end of the tube 30 extends downwardly to a position which is relatively close to the tube 14. The arrangement of the vent tube 30 is such that the recorder pen is properly vented in either a horizontal or vertical position. This arrangement is illustrated in FIGS. 2 and 3 which show the horizontal and vertical positions respectively.

A top portion 33 of the reservoir 10 is provided to prevent ink spillage when the pen is arranged in the vertical position. In the preferred embodiment of the invention the top 33 is sealed to the reservoir 10 and completes the box-like structure. The pen is filled by injecting ink into the reservoir 10 through the feed tube 14. Sealing the top portion 33 to the reservoir 10 minimizes the possibility of spilling ink by inadvertently displacing the top portion 33.

In operation, ink flows from the reservoir 10 through the tube 14 to a chart 34. This ink flow is caused by capillary action, since the area between the tube 14 and the first portion 17 of the integral spring needle 16 is generally similar to a capillary tube. The portion 17 is biased by the portion 18 to its extended position. The portion 17 extends beyond the tube 14 approximately .010 inch and remains in extended position until the pen is brought into engagement with the chart 34. The weight of the pen overcomes the spring pressure and forces the portion 17 in a rearward direction through the tube 14 and into the reservoir 10. The movement of the pen across the chart also tends to produce a small lateral movement between the first portion 17 of the needle 16 and the tube 14. This lateral movement enhances the ink flow. In the preferred embodiment this lateral movement has a magnitude of approximately .005 inch since the outer tube has approximately a .010 inch inside diameter and the wire needle has approximately a .005 inch diameter. The .005 inch integral spring needle according to the preferred embodiment is a stainless wire.

What is claimed is:

1. A recorder pen comprising means defining a generally rectangular reservoir adapted for holding a supply of ink, a hollow ink feed tube and a hollow vent tube, said feed tube fixed in and extending through a base wall of the reservoir, said vent tube disposed within said reservoir, a first end of said vent tube disposed in a lower forward portion of the reservoir relatively close to an inner portion of said feed tube and an opposite end of said vent tube extending through a side wall of the reservoir, an integral spring needle including a first portion extending through said feed tube and extending therefrom and a second portion disposed within said reservoir and separated from said first portion by a bend of approximately 90°, and said second portion disposed within said reservoir and adapted for biasing said first portion through said feed tube in a direction away from said reservoir.

2. A recorder pen comprising means defining a generally rectangular reservoir consisting essentially of plastic material and adapted for holding a supply of ink, a hollow ink feed tube and a hollow vent tube, said feed tube fixed in and extending through a base wall of said reservoir, said feed tube having an inside diameter of approximately .010 inch and an outside diameter of approximately 0.20 inch, said vent tube disposed within said reservoir, a first end of said vent tube disposed in a lower forward position of the reservoir relatively close to an inner portion of said feed tube and an opposite end of said vent tube extending through a side wall of the reservoir whereby the interior of said reservoir is vented from below the normal level of an ink supply when the pen is in a horizontal or vertical position, a stainless steel integral spring needle of approximately .005 inch diameter including a first portion and a second portion, said first portion separated from said second portion by a bend of approximately 90°, said first portion extending through said feed tube and extending therefrom, approximately .010 inch, said second portion disposed within said reservoir and adapted for biasing said first portion through said feed tube in a direction away from said reservoir.

3. A recorder pen comprising means defining a generally rectangular plastic reservoir adapted for holding a supply of ink therein, a hollow ink feed tube and a hollow vent tube, said feed tube fixed to and extending through a base wall of said reservoir, said feed tube having an inside diameter of approximately .010 inch and an outside diameter of approximately .020 inch, and said vent tube disposed within said reservoir, a first end of said vent tube disposed in a lower forward portion of the reservoir relatively close to an inner portion of said feed tube and an opposite end of said vent tube fixed to and extending through a side wall of the reservoir whereby the interior of said reservoir is vented from below the normal level of an ink supply when the pen is in a horizontal or vertical position, a stainless steel integral spring needle of approximately .005 inch diameter including a first portion and a second portion, said first portion separated from said second portion by a bend of approximately 90°, said first portion extending through said feed tube and extending therefrom approximately .010 inch, said second portion disposed within said reservoir and adapted for biasing said first portion through said feed tube in a direction away from said reservoir, and a top portion of said reservoir sealed thereto to thereby form a generally leak proof structure.

References Cited in the file of this patent

UNITED STATES PATENTS

| | | |
|---|---|---|
| 739,319 | Jones | Sept. 22, 1903 |
| 1,800,198 | Carter | Apr. 14, 1931 |
| 2,678,633 | Holden et al. | May 18, 1954 |

FOREIGN PATENTS

| | | |
|---|---|---|
| 929,392 | Germany | June 27, 1955 |